(No Model.) 2 Sheets—Sheet 1.

R. S. JENNINGS.
METHOD OF AND DEVICE FOR ROASTING COFFEE.

No. 308,169. Patented Nov. 18, 1884.

Witnesses:
W. E. Bowen
Chas. R. Burr

Inventor:
Ralph S. Jennings
by Doubleday & Bliss
Attys (No Model.) 2 Sheets—Sheet 2.

R. S. JENNINGS.
METHOD OF AND DEVICE FOR ROASTING COFFEE.

No. 308,169. Patented Nov. 18, 1884.

Witnesses
Chas. R. Burr
W. E. Bowen

Inventor
Ralph S. Jennings
by Doubleday & Bliss
attys

UNITED STATES PATENT OFFICE.

RALPH S. JENNINGS, OF BOSTON, MASSACHUSETTS.

METHOD OF AND DEVICE FOR COFFEE-ROASTING.

SPECIFICATION forming part of Letters Patent No. 308,169, dated November 18, 1884.

Application filed September 19, 1883. (No model.)

*To all whom it may concern:*

Be it known that I, RALPH S. JENNINGS, a citizen of the United States, residing at Boston, in the county of Suffolk and State of Massachusetts, have invented certain new and useful Improvements in Processes of and Devices for Roasting Coffee, &c., of which the following is a specification, reference being had therein to the accompanying drawings.

Figure 1:
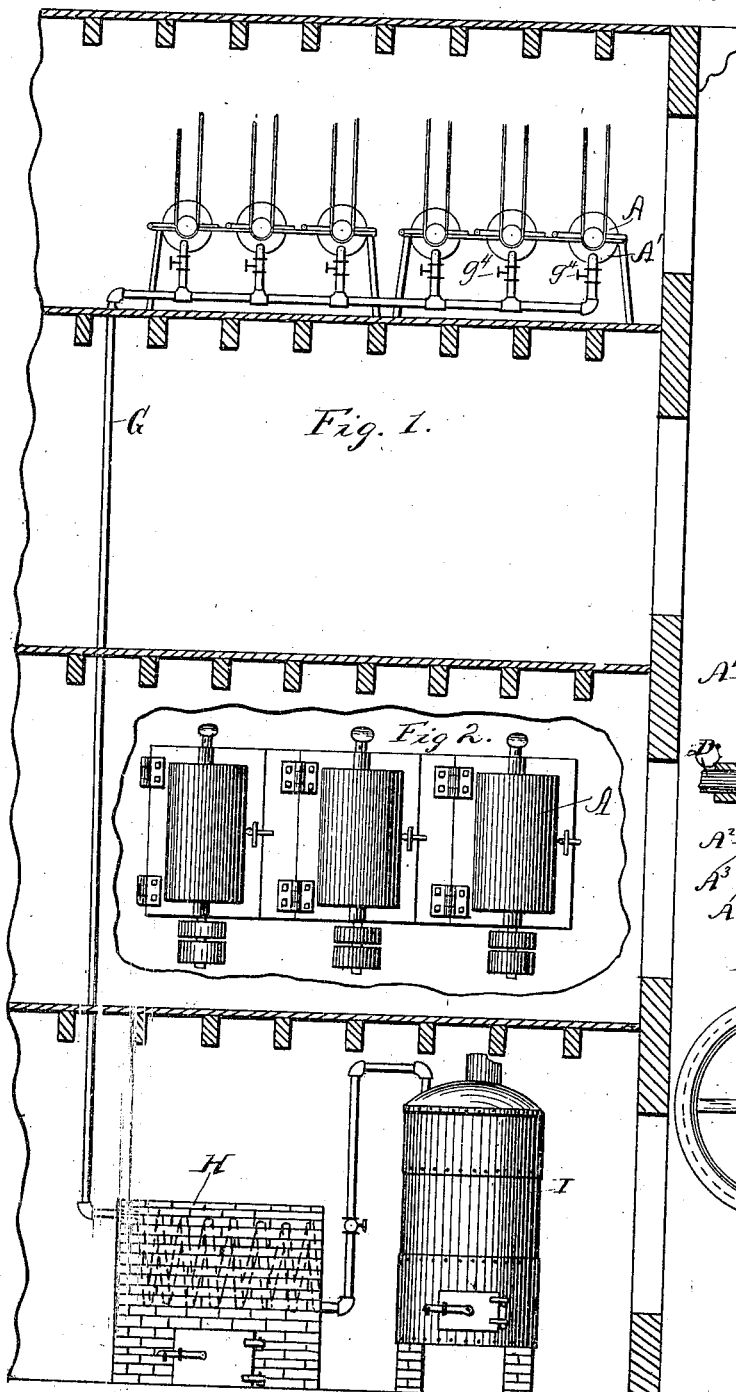
Figure 7:
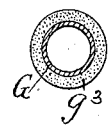
Figure 8:
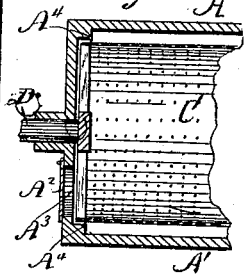
Figure 9:
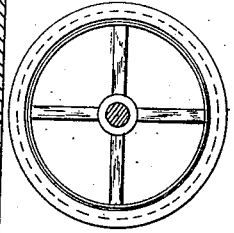
Figure 3:
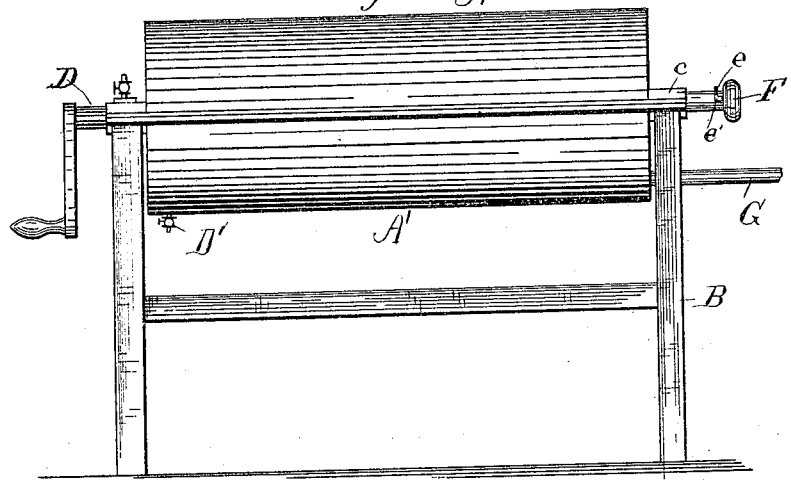
Figure 4:
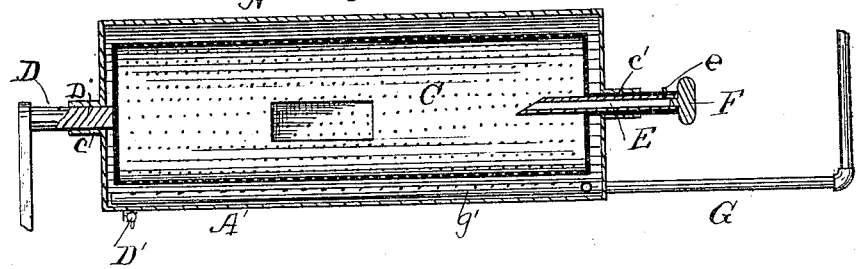
Figure 5:
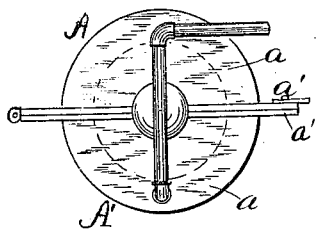
Figure 6:
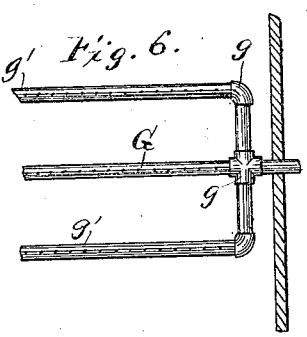

Figure 1 shows a portion of a building in section, having my improved apparatus situated therein. Fig. 2 is a top plan view of a portion of the apparatus shown in Fig. 1. Fig. 3 is a side elevation of a roaster adapted to be operated by hand. Fig. 4 is a vertical longitudinal section of the devices in Fig. 3. Fig. 5 is an end view of the parts in Fig. 4. Fig. 6 shows detached a portion of the pipes for the superheating steam. Fig. 7 is a cross-section of the steam-pipe and its packing. Fig. 8 is a section of a form of roaster differing somewhat from that in Fig. 4, it having means for discharging coffee without removing the roaster from the casing. Fig. 9 is an end view of the roaster shown in Fig. 8.

Referring to Figs. 3, 4, 5, and 6, A A' represent an outer steam-tight drum or casing, preferably made of two cast pieces, each having a semi-cylindrical part, $a$, and a flange, $a'$, extending around it. The flanges $a'$ $a'$ may be bolted or otherwise attached together, so that there shall be inclosed between the parts $a$ $a$ a substantially continuous cylinder. This casing is stationary, and may be mounted in any suitable way, it being shown in Fig. 3 as mounted upon the simple frame B.

By having a stationary casing around the receptacle or holder the steam-duct can be introduced very easily, and there is no necessity of making hollow journals or shafts to admit the steam; and, moreover, a series of two or more branch or supplemental pipes can be employed inside of the casing, and these can be used to any extent around the inside. Within this casing is mounted a rotating vessel, C, in which the coffee is placed which is to be roasted, there being any suitable sliding or hinged door either in the side wall of the vessel or in one of the ends. At the ends it may be mounted in any suitable way. I have shown it as being mounted at one end by means of a hollow trunnion, $c'$, fitting in bearings provided in the end flanges, $a'$ $a'$, of the parts A A' of the outer casing. At the other end the vessel C is mounted in similar bearings, $c$ $c$, by means of a shaft, D. This shaft may be solid, as shown, though I do not wish to be limited to that form. At the outer end the shaft D is provided with a crank, by means of which it can be turned.

E represents a tube adapted to fit snugly within the hollow trunnion $c'$, and it can be secured thereto by means of a bayonet-joint, the part E carrying a pin, $e$, and the trunnion $c$ being provided with an L-shaped slot, as shown at $e'$, Fig. 3. Any suitable handle may be provided to permit the tube E to be withdrawn for the purpose of testing the degree to which the material has been roasted.

G represents a steam-pipe which passes through one end of the part A' of the outside casing, and which communicates with a superheater. Inside of the casing the pipe G, by means of suitable elbows, $g$, communicates with several branch steam-pipes, $g'$, properly situated under the vessel C, and from which the steam comes into contact with the contents of the vessel.

Referring now to Figs. 1 and 2, it will be seen that the pipe G passes down through the several floors of the building to the basement or cellar, where it is connected with a superheater at H. This may be made in any preferred way. To the superheater the steam is conveyed from a boiler, I, which also may be of any preferred kind.

Heretofore in houses where the roasting of coffee has been carried on on a large scale it has been customary to have the roasting done by means of the direct application of the heat of a fire. Moreover, as such houses are generally constructed and as the business is generally carried on, it is necessary to have the roasting of the coffee effected at the top of the building. There is danger, as is well known, from having the fires located in this part of the building; and one of the objects of my invention is to obviate the necessity of having fires at that point. By carrying the steam from the basement, (where one or more furnaces are generally employed,) the additional danger from fire in coffee-houses is avoided.

If necessary, that portion of the steam-duct which is beyond and above the superheater may be covered with asbestos, as at $g^3$, Fig. 7, or other non-conducting packing, whereby the dissemination and loss of heat therefrom can be prevented. The steam is heated until it is made thoroughly dry, and is raised to a high degree of temperature and pressure. By the use of it the escape of any of the aroma and desirable qualities of the coffee is avoided. The roasting being done under pressure, the gaseous and vaporous ingredients, which are generally driven off, are prevented from escaping, and are retained in the berry, so that by following this process an article of very superior quality is obtained. If it is found necessary, the pressure of steam within the roaster may be reduced, and more or less of it withdrawn by means of any suitable devices.

As shown in Figs. 1 and 2, several outside casings may be secured together—that is to say, several of the lower parts, $A'$, of the outer casings may be cast in one piece, and the corresponding parts, A, can be secured thereto. In this case the revolving receptacles C are driven by power from a shaft by pulleys and belts or gearing. As shown in Fig. 2, each shaft is provided with two pulleys, one being fast and the other loose, so that each roaster can be stopped independently of the others, either for filling, emptying, or other purposes. The upper part, A, of the casing may be clamped in place against the lower one by means of any of the ordinary devices of the nature of clamps used for such purposes, and, if necessary, a rubber or other packing may be interposed between the parts $a'$ $a'$, so that a perfectly steam-tight joint can be provided. Each branch pipe from the pipe G is provided with a valve or stop-cock, $g^4$, by which the entrance of steam can be shut off at any instant desired.

In Figs. 8 and 9 is shown a modified form of the roasting device. In this case the revolving part C is open at one end, as shown in said figures, and the casing portion is provided with an aperture, $A^3$, through which the coffee can be discharged from the roaster. This aperture can be provided with a steam-tight door, $A^2$, having clamping devices of any of the common forms for securing it in place. In this case the outer casing may be brought close to the end of the rotary part C. As shown, the casing is provided with a flange, $A^4$. The end of the rotary part C can be situated within this flange, and thus be brought sufficiently near to the casing to prevent the material from interfering with the rotation.

The water of condensation which may collect in the bottom of the casing can be removed through an aperture in the bottom, provided with a valve or stop-cock, as shown at $D'$, Figs. 3 and 4.

I am aware of the fact that steam has been used for the drying of lumber and for the cooking of oysters and other articles of food, and also that it has been employed in cleaning and otherwise treating grain; and I do not broadly claim the use of steam either in its ordinary form or in a superheated condition for such purposes; but I am not aware of the fact that it has been used in a manner or applied by means of devices, of the character herein set forth and shown. Steam has been used to affect the surfaces of such articles as berries, of grain, &c., for the purpose of cleansing and drying them; but I do not belive it has been heretofore known that the particular article which I treat can be roasted or parched by means of the devices and agent which I employ in such way as to avoid many of the disadvantages which have been hitherto incident to the treatment of the coffee-berry.

I am also aware of the fact that steam has been used for the purpose of affecting coffee which has been moistened and damaged during transportation, to impart thereto the appearance of good coffee, the treatment alluded to not being intended to effect the parching or roasting of the coffee. The steam was not used for the purpose at which I aim, nor in the manner which I follow.

I do not in this case claim the subject-matter herein described, consisting in arranging the coffee in a mass or masses within a steam-tight casing and delivering the superheated steam at points within said casing and outside of the said mass or masses; nor do I claim herein the means specially arranged for carrying out this process, as I shall make these the subjects-matter of another application which I am about to file.

What I claim is—

1. The herein-described process of roasting coffee, which consists in subjecting it to the action of superheated steam brought into direct contact with the coffee, and generated from moisture independent of that found in the coffee, the action of the steam being continued until the berries have been parched, substantially as set forth.

2. The herein-described process of roasting coffee, consisting in subjecting the coffee, while inclosed in a tight casing, to the action of superheated steam brought into direct contact therewith and generated from moisture independent of that found in the coffee, substantially as set forth.

3. The herein-described process of roasting coffee, consisting in subjecting it while being agitated in a tight casing to the action of superheated steam generated from moisture independent of that in the coffee, and brought into direct contact with the coffee, substantially as set forth.

4. In a device for roasting coffee, the combination of a movable receptacle which holds the material and wherein it is agitated, the steam-duct G, which delivers the steam directly into contact with the coffee, a superheater, H, for the steam, and a boiler, I, substantially as set forth.

5. In a device for roasting coffee, the combination of the rotating receptacle or holder, the tight casing around the holder, the steam-pipe which enters the tight casing, and is provided with escape-apertures for the steam, and a boiler independent of the coffee-holder, which supplies said steam-pipe with steam, substantially as set forth.

6. In a device for roasting coffee, the combination of the means for holding and agitating the coffee, a tight stationary casing which surrounds the coffee holding and agitating means, and a steam-pipe which enters the outer tight stationary casing and is independent of the supports for the coffee-holder, substantially as set forth.

In testimony whereof I affix my signature in presence of two witnesses.

RALPH S. JENNINGS.

Witnesses:
WM. H. MEARS,
G. H. GILBERT.